United States Patent [19]

Allgeier et al.

[11] 3,870,706

[45] Mar. 11, 1975

[54] 6H-S-TRIAZOLO[4,3-a] [1.4]BENZODIAZEPIN-6-ONES

[75] Inventors: Hans Allgeier, Haagen, Germany; Andre Gagneux, Basle, Switzerland

[73] Assignee: Ciba-Geigy Corporation, Ardsley, N.Y.

[22] Filed: Feb. 23, 1973

[21] Appl. No.: 335,268

[30] Foreign Application Priority Data
Feb. 29, 1972 Switzerland.......................... 2917/72
May 8, 1972 Switzerland.......................... 6818/72

[52] U.S. Cl... 260/239.3 T, 260/239 B, 260/247.5 R, 260/293.69, 260/308 R, 260/326.5 C, 424/244, 424/248, 424/267, 424/269, 424/274
[51] Int. Cl. ...................... C07d 53/06, C07d 55/06
[58] Field of Search ............................ 260/239.3 T

[56] References Cited
UNITED STATES PATENTS
3,681,343  8/1972  Hester.......................... 260/239.3 T

*Primary Examiner*—Henry R. Jiles
*Assistant Examiner*—Robert T. Bond
*Attorney, Agent, or Firm*—Joseph G. Kolodny; John J. Maitner; Theodore O. Groeger

[57] ABSTRACT

This invention provides a new process for the production of compounds of the class of 1-substituted 6-phenyl-4H-s-triazolo[4,3-a][1,4]benzodiazepines and new intermediates for this process. The compounds produced by this process have valuable pharmacological properties. In particular, they possess anticonvulsant and antiaggressive activity and inhibit somatic reflexes. According to a specific embodiment, 1-(benzyloxymethyl)4,5-dihydro-8-chloro-6H-s-triazolo[4,3-a][1,4]benzodiazepin-6-one is reacted with phenylmagnesium bromide, and the resulting 1-benzyloxymethyl)-6-phenyl-8-chloro-4H-s-triazolo[4,3-a][1,4]benzodiazepine is heated with hydrobromic acid-acetic acid to yield 6-phenyl-8-chloro-4H-s-triazolo[4,3-a][1,4]benzodiazepine-1-methanol.

8 Claims, No Drawings

6H-S-TRIAZOLO[4,3-α][1,4]BENZODIAZEPIN-6-ONES

DETAILED DESCRIPTION

The present invention relates to a process for the production of new diazepine derivatives.

The new diazepine derivatives correspond to the general formula I

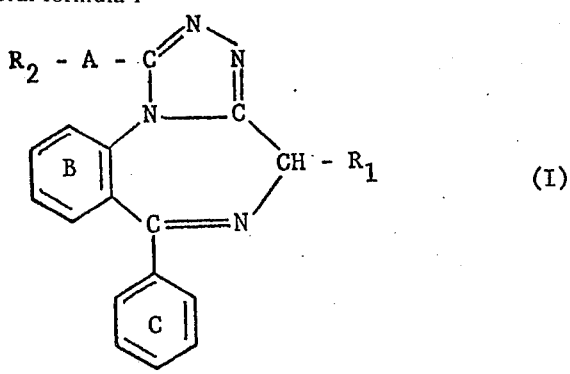

wherein
- $R_1$ represents hydrogen, or an alkyl group having 1 to 3 carbon atoms,
- A represents an alkylene group having 1 to 3 carbon atoms,
- $R_2$ represents the hydroxyl group, an alkoxy group having 1 to 6 carbon atoms, a mono- or diarylmethoxy group, a dialkylamino, N-alkyl-aralkylamino or diaralkylamino group wherein alkyl groups contain 1 to 6 and aralkyl groups 7 to 9 carbon atoms, a polymethyleneimino radical having 5 to 7 ring members or a morpholino radical, which cyclic radicals may be substituted by lower alkyl groups and which contain including these at most 10 carbon atoms, or
- $R_2$-A together represent a dialkoxymethyl group of which the alkoxy radicals have 1 to 4 carbon atoms, or an alkylenedioxymethyl group having in all 3 to 6 carbon atoms, and
- the rings B and C are unsubstituted or substituted by halogen up to atomic number 35, alkyl or alkoxy groups having 1 to 6 carbon atoms, or trifluoromethyl groups.

The invention likewise relates to the production of pharmaceutically acceptable addition salts of the compounds of the general formula I with inorganic and organic acids.

In the compounds of the general formula I, $R_1$ as an alkyl group is, e.g. the methyl, ethyl or propyl group. By an alkylene group A is meant any desired bivalent, saturated aliphatic hydrocarbon radical having 1 to 3 carbon atoms, such as the methylene, ethylidene, 1-methylethylidene, ethylene, propylene or trimethylene group; of particular importance among these groups is the methylene group.

As an alkoxy group, $R_2$ is, for example, the propoxy, isopropoxy, butoxy, isobutoxy, pentyloxy, isopentyloxy, hexyloxy or isohexyloxy group, preferably, however, the methoxy or ethoxy group; as a monoarylmethoxy group, $R_2$ is, e.g. the benzyloxy, o-, m- or p-chlorobenzyloxy, o-, m- or p-methyl-benzyloxy, o-, m- or p-methoxybenzyloxy or 3,4,5-trimethoxy-benzyloxy group; and as a diarylmethoxy group, $R_2$ is, in particular, the diphenylmethoxy group.

The alkyl groups of the dialkylamino and N-alkyl-aralkylamino groups $R_2$ are, for example, propyl, isopropyl, butyl, isobutyl, pentyl, isopentyl or hexyl groups, and preferably methyl or ethyl groups; and aralkyl groups in diaralkylamino or N-alkyl-aralkylamino groups $R_2$ are, for example, phenethyl, α-, o-, m- or p-methylbenzyl, 3-phenyl-propyl, α-methylphenethyl and, in particular, benzyl groups. As a polymethyleneimino radical, $R_2$ is a 1-pyrrolidinyl, piperidino or hexahydro-1H-azepin-1-yl radical. In the same way as the morpholino radical, these radicals can be mono- or poly-substituted by ethyl, propyl or, in particular, methyl groups, provided the maximum number of 10 carbon atoms is not exceeded.

As a dialkoxymethyl group, $R_2$-A is, for example, the dimethoxymethyl or diethoxymethyl group.

Halogen atoms as substituents of the rings B and C are fluorine, chlorine or bromine atoms, while as alkyl groups and alkoxy groups having 1 to 6 carbon atoms they are, e.g. methyl, ethyl, propyl, isopropyl, butyl, isobutyl, tert. butyl, pentyl, isopentyl, 2,2-dimethylpropyl, hexyl or isohexyl groups and methoxy, ethoxy, propoxy, isopropoxy, butoxy, isobutoxy, pentyloxy, isopentyloxy, 2,2-dimethylpropoxy, hexyloxy or isohexyloxy groups, respectively. A substitutent of the ring B is particularly in the 8-position, and is preferably fluorine, bromine, the trifluoromethyl group and, in particular, chlorine. The ring C is preferably unsubstituted, or substituted by fluorine, chlorine or bromine in any desired position, especially, however, by fluorine or chlorine in the o-position.

The compounds of the general formula I and their addition salts with inorganic and organic acids possess valuable pharmacological properties. They have a central depressant action, e.g. an anticonvulsive and an anti-aggressive action; they also inhibit somatic reflexes. The anticonvulsive effectiveness can be shown, for example, in the electroshock test on the mouse with oral doses of from ca. 2.0 mg/kg; in the psychomotor electroshock test on the mouse with oral doses of from ca. 0.4 mg/kg; in the strychnine convulsion test on the mouse with oral doses of from ca. 1.5 mg/kg; and in the pentetrazole test on the mouse with oral doses of from ca. 0.05 mg/kg. The anti-aggressive action is evident from the degree of inhibition of the fighting reaction of the mouse after oral administration of doses of from ca. 0.3 mg/kg, while the general depression of the central nervous system is evident, for example, from the anaesthetic-potentiating action and from the "test de la traction" after oral administration to the mouse, as well as from observation tests. The mentioned properties and further properties, which can be determined by selected standard tests [ cp. W. Theobald and H. A. Kunz, Arzneimittelforsch. 13, 122 (1963), and also W. Theobald et al., Arzneimittelforsch. 17, 561 (1967)], characterise the compounds of the general formula I and their 5-oxides, as well as the pharmaceutically acceptable addition salts of the compounds of the general formula I with inorganic and organic acids, as active substances for tranquillisers and anticonvulsants which are applicable, for example, for the treatment of states of tension and agitation, as well as for the treatment of epilepsy.

Of special importance are compounds of the general formula I having hydrogen as $R_1$, the hydroxyl group as $R_2$, and an alkylene group, particularly the methylene group, as A; and among these compounds especially those having a chlorine atom in the 8-position, particularly 6-phenyl-8-chloro-4H-s-triazolo[4,3-a][1,4]benzodiazepine-1-methanol, as well as 6-(o-fluorophenyl)- and 6-(o-chlorophenyl)-8-chloro-4H-s-triazolo[4,3-a][1,4]benzodiazepine-1-methanol. Compounds with a mono- or diarylmethoxy group as $R_2$ are important not only because of their inherent pharmacological effectiveness, but because of, in particular, their importance as intermediates for the production of corresponding compounds having a hydroxyl group $R_2$. Preferred compounds therefore among these compound types are likewise those with hydrogen as $R_1$ and the methylene group as A, among which especially those compounds wherein at the same time ring B is substituted in the 8-position by chlorine, while ring C is either unsubstituted or substituted in the o-position by fluorine or chlorine, and the radical $R_2$ is preferably an easily cleavable group such as the benzyloxy, p-methoxybenzyloxy or diphenylmethoxy group. Compounds distinguished by valuable inherent pharmacological properties are also compounds having a benzyloxy group $R_2$ and an ethylene group A, such as 1-(2-benzyloxyethyl)-6-phenyl-8-chloro-4H-s-triazolo[4,3-a][1,4]benzodiazepine. Among the compounds having a disubstituted amino group $R_2$, those are of special pharmacological importance which contain as this group the dimethylamino or diethylamino group, together with a methylene group A, a hydrogen atom as $R_1$, and the aforementioned substitution arrangements for the rings B and C, while corresponding compounds having an N-methyl-benzylamino group, N-ethylamino-benzylamino group or dibenzylamino group $R_2$ are of value particularly as intermediates for the production of compounds having a methylamino, ethylamino or amino group as $R_2$. Of particular importance, finally, are compounds of the general formula I in which $R_2$-A together represent the dimethoxymethyl group, and especially the diethoxy group, while $R_1$ represents hydrogen, and the rings B and C have the above mentioned preferred substitution arrangements.

According to the process of the present invention for the production of the compounds of the general formula I, a compound of the general formula II

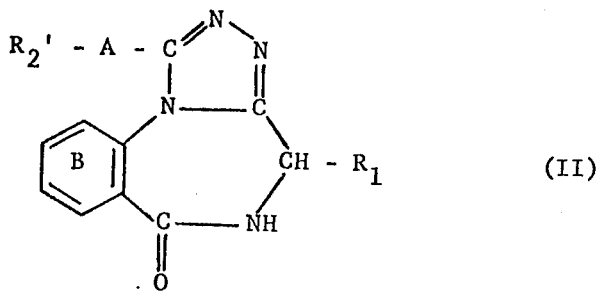

wherein $R_2'$ has the meaning given for $R_2$ under formula I, with the exception of the hydroxyl group, $R_1$, A and $R_2'$-A have the meanings given for $R_1$, A and $R_2$-A under formula I, and the ring B is unsubstituted or substituted as defined there, or a metal derivative of such a compound, is reacted with a compound of the general formula III

wherein

Hal represents bromine or iodine, and the ring C is unsubstituted or substituted as defined under formula I, or with an alkali-metal-organic or cadmium-organic phenyl compound, which is unsubstituted or substituted in the same manner; and, optionally, an obtained reaction product of the general formula Ia embraced by the general formula I

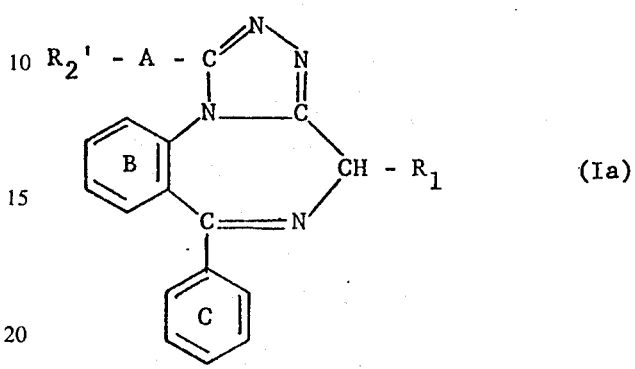

wherein $R_2'$ is a monoarylmethoxy or diarylmethoxy group, while $R_1$ and A have the meanings given under formula I, and the rings B and C are unsubstituted or substituted as defined there, cleaved to give a compound of the general formula I of which the radical $R_2$ is the hydroxyl group;

and/or, optionally, a compound of the general formula Ia or I converted into a pharmaceutically acceptable addition salt with an inorganic or organic acid.

To effect the reaction according to the invention with use of compounds of the general formula III, these compounds, as a solution in an organic solvent of which the molecules contain at least one ether oxygen atom, such as, e.g. tetrahydrofuran or particularly diethyl ether, are combined wtih the solution of a compound of the general formula II in an inert organic solvent; and the reaction completed at temperatures of between ca. 20° and 100°C, or at the boiling temperature of the reaction mixture if this should be lower. By inert organic solvents are meant in this case such solvents which undergo with Grignard compounds neither a Zerewitinow reaction nor a Grignard reaction. Besides the already mentioned ethereal solvents, suitable solvents are, for example, aromatic hydrocarbons such as benzene or toluene. To raise the reaction temperature, the ether introduced as solvent for the Grignard compound into the reaction mixture, particularly diethyl ether, can be extensively evaporated off in the course of the reaction.

For reactions with optionally substituted alkali-metal-organic and cadmium-organic phenyl compounds, it is possible to use essentially the types of solvents already mentioned for the Grignard reactions. With the use of lithium-organic phenyl compounds, such as phenyl-lithium, reaction temperatures similar to those in the case of the corresponding Grignard reactions are to be applied, while reactions with sodium- or potassium-organic phenyl compounds, such as phenyl sodium or phenyl potassium, are to be performed at lower reaction temperatures. On the other hand, the reactions with cadmium-organic phenyl compounds, such as diphenyl cadmium, require rather more energetic reaction conditions than those in the corresponding Grignard reactions.

Metal derivatives of compounds of the general formula II are, in particular, their alkali metal derivatives such as, e.g. their lithium or sodium derivatives. These are produced from the compounds of the general formula II, preferably in situ, i.e. immediately before the metalloorganic reaction in the inert organic solvent used for the reaction, such as, e.g. benzene, by reaction with an alkali metal derivative such as sodium hydride or sodium amide, or lithium hydride or lithium amide, with heating and, if the occasion arises, evaporation of the ammonia.

The cleavage (optionally following the metalloorganic reaction) of compounds of the general formula Ia of which the radical $R_2'$ is a monoarylmethoxy or diarylmethoxy group to form compounds of the general formula I of which the radical $R_2$ is the hydroxyl group is preferably performed with the aid of hydrohalic acids such as hydrochloric acid, hydriodic acid or, in particular, hydrobromic acid. It is advantageous to apply the hydrohalic acids in a solvent. Suitable solvents are carboxylic acids, such as acetic acid. The reaction temperature is between ca. 20° and 150°C.

The starting materials of the general formula II are, for their part, new compounds that can be produced, for example, by the condensation of a compound of the general formula IIa

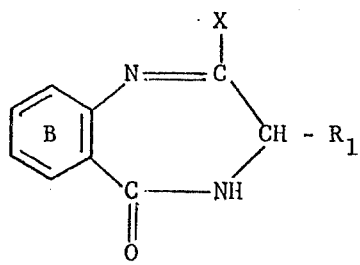

wherein
X represents a cleavable radical, particularly the amino group, also, e.g. a chlorine atom, the methylamino, methylthio or methoxoy group,
$R_1$ has the meaning given under formula I, and the ring B is unsubstituted or substituted as defined there,
with a compound of the general formula IIb

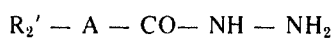

wherein A has the meaning given under formula I, $R_2'$ the meaning given under formula II, or $R_2'$-A the meaning given for $R_2$-A under formula I. This condensation is carried out preferably at a reaction temperature of ca. 80° to 180°C in an inert solvent. Suitable inert solvents are, for example, hydrocarbons such as toluene or xylene,, halogenated hydrocarbons such as chlorobenzene, ethereal liquids such as diethylene glycol dimethyl ether, diethylene glycol diethyl ether or dioxane, amides, particularly N,N,N',N',N'',N''-hexamethylphosphoric acid triamide or N,N-dimethylacetamide, sulphoxides such as dimethylsulphoxide, and alcohols such as n-butanol. The reaction times are preferably between ca. 1 and 24 hours.

Of the compounds of the general formula IIa, two representative compounds having an amino group as the cleavable group X: 2-amino-3,4-dihydro-5H-1,4-benzodiazepin-5-one and 2-amino-3,4-dihydro-7-chloro-5H-1,4-benzodiazepin-5-one, have been produced by M. Julia et al., Chim.therap. 5 (5), 343–346 (1970), by the refluxing of 2-amino-N-(cyanomethyl)-benzamide and 2-amino-5-chloro-N-(cyanomethyl)-benzamide, respectively, with sodium hydride in tetrahydrofuran. Further compounds of the general formula IIa having an amino group X can be produced analogously. Compounds of the general formula IIa having other cleavable groups X are obtained, for example, starting with 1,3-dihydro-2H-benzodiazepine-2,5(4H)-dione, or with derivatives thereof substituted, as defined, in ring B, by utilisation of the greater reactivity of the lactam grouping in the 1,2-position in comparison with that of the lactam grouping in the 5,4-position. Already known is the reaction of the stated compounds with methylamine in boiling tetrahydrofuran/benzene mixture, with the use of titanium tetrachloride as condensing agent, by which reaction are obtained compounds of the general formula IIa having a methylamino group as X.

Of the compounds of the general formula IIb, some are known, e.g. benzyloxyacetic acid hydrazide, methoxyacetic acid hydrazide, ethoxyacetic acid hydrazide, N,N-dimethylglycine hydrazide and dimethoxyacetic acid hydrazide. Other hydrazides can be produced, e.g. by hydrazinolysis from the corresponding methyl or ethyl esters, of which a considerable number are known, e.g. 2-(p-methoxybenzyloxy)-acetic acid hydrazide from the corresponding known ethyl ester, and diethoxyacetic acid hydrazide from the corresponding known methyl ester.

The compounds of the general formula I obtained by the process according to the invention are optionally converted, in the usual manner, into pharmaceutically acceptable addition salts with inorganic and organic acids. For example, the addition salts are obtained by use of the following: hydrochloric acid, hydrobromic acid, sulphuric acid, phosphoric acid, perchloric acid, methanesulphonic acid, ethanesulphonic acid or citric acid, preferably in the presence of a solvent such as, e.g. acetone, methanol, ethanol, ether, or mixtures thereof.

The compounds of the general formula I as well as their pharmaceutically acceptable acid addition salts are preferably administered orally or rectally; however, aqueous solutions of pharmaceutically acceptable acid addition salts may also be administered parenterally. The daily doses vary between 0.01 and 2 mg/kg for warm-blooded animals. Suitable dosage units, such as dragees, tablets and suppositories, preferably contain 0.5 – 25 mg of an active substance according to the invention, i.e. of a compound of the general formula I or of one of its pharmaceutically acceptable acid addition salts. The mentioned dosage units as well as ampoules with aqueous solutions of pharmaceutically acceptable salts can be produced in the usual manner.

The following examples further illustrate the carrying out of the process according to the invention for the production of the new compounds of the general formula I, as well as of starting materials not htherto known; the examples do not, however, in any way limit the scope of the invention. Temperatures are expressed in degrees Centigrade. The petroleum ether used in all cases is one having a boiling range of 40 to 65°C.

EXAMPLE 1 a. A solution of 10.5 g (0.05 mole) of 2-amino-3,4-dihydro-7-chloro-5H-1,4-benzodiazepin-5-one and 9.9 g (0.055 mole) of benzyloxyacetic acid hydrazide [cp. Curtius and N. Schwan, J. prakt. Chem. [2] 51, 353 (1895)] in 100 ml of hexamethylphosphoric acid triamide is heated for 4 hours at 140°. The solvent is then distilled off in vacuo, and the residue distributed between methylene chloride and water. The organic phase is washed with saturated sodium chloride solution, dried over magnesium sulphate, and concentrated by evaporation. The residue of syrupy consistency is crystallised from ethyl acetate/petroleum ether (boiling range 40–65°) to obtain 1-(benzyloxymethyl)-4,5-dihydro-8-chloro-6H-s-triazolo[4,3-a][1,4]benzodiazepin-6-one, M.P. 157–159°.

The following compounds are obtained in an analogous manner if the benzyloxyacetic acid hydrazide is replaced by the stated amount — corresponding in each case to 0.055 mole — of other hydrazides:

with 11.5 g of (p-methoxybenzyloxy)-acetic acid hydrazide (oily, obtainable by reaction of (p-methoxybenzyloxy)-acetic acid ethyl ester [cp. A. Viout and H. Gault, Compt. rend. 237, 1162 (1953)] with 22.3 g of hydrazine hydrate in 800 ml of abs. ethanol, for 3 days at 25°):-1-[(p-methoxybenzyloxy)-methyl]-4,5-dihydro-8-chloro-6H-s-triazolo[4,3-a[]1,4]benzodiazepin-6-one;

with 5.7 g of methoxyacetic acid hydrazide (cp. E. J. Browne and J. B. Polya, J.Chem.Soc. 1962, 5149-5152):-1-(methoxymethyl)-4,5-dihydro-8-chloro-6H-s-triazolo [4,3-a][1,4]benzodiazepin-6-one;

with 6.5 g of ethoxyacetic acid hydrazide [cp. Curtius, J. prakt. Chem. [2] 95, 171 (1917)]:- 1-(ethoxymethyl)-4,5-dihydro-8-chloro-6H-s-triazolo[4,3-a][1,4]benzodiazepin-6-one;

with 7.3 g of 3-ethoxy-propionic acid hydrazide (B.P. ca. 120°/0.001 Torr, M.P. 34°, obtainable by reaction of 30 g of 3-ethoxypropionic acid methyl ester [cp. C. E. Rehberg et al., J.Am.Chem. Soc. 68, 544-546 (1946)] with 22.7 g of hydrazine hydrate in 800 ml of abs. ethanol, for three days at 25°):- 1-(2-ethoxyethyl)-4,5-dihydro-8-chloro-6H-s-triazolo[4,3-a][1,4[benzodiazepin-6-one, and with 10.7 g of 3-benzyloxy-propionic acid hydrazide (B.P. ca. 150°/0.005 Torr, obtainable by reaction of 96.5 g of 3-benzyloxypropionic acid methyl ester [cp. J. J. Bloomfield, J.Org.Chem. 27, 2742 (1962)] with 49.6 g of hydrazine hydrate in 1000 ml of abs. ethanol, for 3 days at 25°):- 1-(2-benzyloxyethyl)-4,5-dihydro-8-chloro-6H-s-triazolo[4,3-a][1,4]benzodiazepin-6-one.

There is obtained, likewise analogously, by reaction of 8.8. g (0.05 mole) of 2-amino-3,4-dihydro-5H-1,4-benzodiazepin-5-one with 9.9 g (0.055 mole) of benzyloxyacetic acid hydrazide: 1-(benzyloxymethyl)-4,5-dihydro-6H-s-triazolo [4,3-a][1,4]benzodiazepin-6-one.

b. The solution of 1.82 g (0.005 mole) of phenylmagnesium bromide in 4 ml of ether is added, with stirring, to the refluxing solution of 1.77 g (0.005 mole) of 1-(benzyloxymethyl)-4,5-dihydro-8-chloro-6H-s-triazolo [4,3-a][1,4]benzodiazepin-6-one in 80 ml of benzene. The formed suspension is refluxed for 1 hour, then cooled and distributed between ethyl acetate and water. The organic phase is washed with saturated sodium chloride solution, and concentrated by evaporation. The residue of syrupy consistency is chromatographed with ethyl acetate/isopropanol (7:1) through silica gel. The eluted crude reaction product ($R_f$ 0.56 in ethyl acetate/isopropanol 7:2) is recrystallised from ethyl/petroleum ether to obtain 1-(benzyloxymethyl)-6-phenyl-8-chloro-4H-s-triazolo [4,3-a][1,4]benzodiazepine, M.P. 162-164°.

The following compounds are obtained in an analogous manner if the 1-(benzyloxymethyl)-4,5-dihydro-8-chloro-6H-s-triazolo[4,3-a][1,4]benzodiazepin-6-one is replaced by the stated amount — corresponding in each case to 0.005 mole — of other starting materials, and the crude products crystallised from ethyl acetate/petroleum ether (boiling range 40–65°):

with 1.92 g of 1-[(p-methoxybenzyloxy)-methyl]-4,5-dihydro-8-chloro-6H-s-triazolo[4,3-a][1,4]benzodiazepin-6-one:- 1-[(p-methoxybenzyloxy)-methyl]-6-phenyl-8-chloro-4H-s-triazolo[4,3-a][1,4]benzodiazepine, M.P. 157–159°;

with 1.39 g of 1-(methoxymethyl)-4,5-dihydro-8-chloro-6H-s-triazolo[4,3-a][1,4]benzodiazepin-6-one:- 1-(methoxymethyl)-6-phenyl-8-chloro-4H-s-triazolo[4,3-a][1,4]benzodiazepine, M.P. 185–191°;;

with 1.46 g of 1-(ethoxymethyl)-4,5-dihydro-8-chloro-6H-s-triazolo[4,3-a][1,4]benzodiazepin-6-one:- 1-(ethoxymethyl)-6-phenyl-8-chloro-4H-s-triazolo[4,3-a][1,4]benzodiazepine, M.P. 161–165°;

with 1.53 g of (1-2-ethoxyethyl)-4,5-dihydro-8-chloro-6H-s-triazolo[4,3-a][1,4]benzodiazepin-6-one: 1-(2-ethoxyethyl)-6-phenyl-8-chloro-4H-s-triazolo[4,3-a][1,4]benzodiazepine, M.P. 128–132°;

with 1.84 g of 1-(2-benzyloxyethyl)-4,5-dihydro-8-chloro-6H-s-triazolo[4,3-a][1,4]benzodiazepin-6-one: 1-(2-benzyloxyethyl)-6-phenyl-8-chloro-4H-s-triazolo[4,3-a][1,4]benzodiazepine, M.P. 115-117°; and with 1.60 g of 1-(benzyloxymethyl)-4,5-dihydro-6H-s-triazolo [4,3-a][1,4]benzodiazepin-6-one: 1-(benzyloxymethyl)-6-phenyl-4H-s-triazolo[4,3-a][1,4]benzodiazepine, M.P. 167–168°.

The starting materials for stage (a) of the above example are produced as follows [cp. M. Julia, Chim. therap. 5 (5), 343–346 (1970)]:

c. An amount of 31 g (0.201 mole) of aminoacetonitrile-hydrogen sulphate is added to a solution of 40 g (0.201 mole) of 6-chloro-2H-3,1-benzoxazine-2,4(1H)-dione (5-chloroisatoic acid anhydride) and 40 g (0.398 mole) of triethylamine in 600 ml of pyridine; the mixture is heated for 3 hours at 80°, until the evolution of carbon dioxide has ceased. The reaction mixture is then distributed between methylene chloride and water. The organic phase is separated, washed with saturated sodium chloride solution, dried over magnesium sulphate, and concentrated by evaporation. The residue of syrupy consistency is dissolved in ethyl acetate/methanol (9:1), and the solution filtered through an aluminium oxide column. The filtrate is concentrated by evaporation, and the residue recrystallised from ethyl acetate/petroleum ether to obtain 2-amino-5-chloro-N-(cyanomethyl)-benzamide, M.P. 154–155°.

There is obtained in an analogous manner, with the use of 32.6 g (0.20 mole) of 2H-3,1-benzoxazine-2,4(1H)-dione (isatoic acid anhydride), 2-amino-N-(cyanomethyl)-benzamide.

a. A solution of 11.0 g (0.055 mole) of 2-amino-5-chloro-N-(cyanomethyl)-benzamide in 70 ml of abs. tetrahydrofuran is added dropwise within 20 minutes to a suspension of 1.92 g (0.08 mole) of sodium hydride (used as a 50% suspension in mineral oil = 3.85 g) in 200 ml of abs. tetrahydrofuran. The reaction mixture is then refluxed for 2 hours with stirring, and subsequently stirred for a further hour at room temperature. The excess sodium hydride is decomposed with ethanol, and the mixture then concentrated by evaporation. The crystalline residue is recrystallised from ethanol/ethyl acetate to obtain 2-amino-3,4-dihydro-7-chloro-5H-1,4-benzodiazepin-5-one, M.P. 269–270°.

There is obtained in an analogous manner, with the use of 9.38 g (0.055 mole) of 2-amino-N-(cyanomethyl)-benzamide, 2-amino-3,4-dihydro-5H-1,4-benzodiazepin-5-one, M.P. 235°.

EXAMPLE 2

There are obtained, analogously to Example 1b, by the reaction of 1.92 g (0.005 mole) of 1-[(p-methoxybenzyloxy)-methyl]-4,5-dihydro-8-chloro-6H-s-triazolo [4,3-a][1,4]benzodiazepine in 80 ml of benzene
  with the solution of 2.0 g (0.005 mole) of (o-fluorophenyl)-magnesium bromide in 10 ml of ether, which is gradually distilled off, 1-[(p-methoxybenzyloxy)-methyl]-6-(o-fluorophenyl)-8-chloro-4H-s-triazolo[4,3-a][1,4] benzodiazepine, M.P. 163.5 – 165° (from ethyl acetate/petroleum ether), and
  with the solution of 2.16 g (0.005 mole) of (o-chlorophenyl)-magnesium bromide in 10 ml of ether, which is gradually distilled off, 1-[(p-methoxybenzyloxy)-methyl]-6-(o-chlorophenyl)-8-chloro-4H-s-triazolo[4,3-a][1,4] benzodiazepine, M.P. 200 – 203° (from ethyl acetate).

EXAMPLE 3

0.12 g (0.005 mole) of sodium hydride is added to a solution of 1.77 g (0.005 mole) of 1-(benzyloxymethyl)-4,5-dihydro-8-chloro-6H-s-triazolo[4,3-a][1,4]benzodiazepin-6-one in 80 ml of benzene. The formed suspension is stirred for 10 minutes at 20°, and an addition then made to it of a solution of 1.82 g (0.005 mole) of phenylmagnesium bromide in 4 ml of ether. The suspension is refluxed for one hour, then cooled, and distributed between ethyl acetate and water. The organic phase is washed with saturated aqueous sodium chloride solution and concentrated by evaporation. The residue of syrupy consistency is chromatographed, analogously to Example 1b, with ethyl acetate/isopropanol (7:1) through silica gel. The eluted crude reaction product is recrystallized from ethyl acetate/petroleum ether to obtain 1-(benzyloxymethyl)-6-phenyl-8-chloro-4H-s-triazolo[4,3-a][1,4]benzodiazepine, M.P. 162–164°.

EXAMPLE 4 a. The following are obtained analogously to Example 1a by reaction of 10.5 g (0.05 mole) of 2-amino-3,4-dihydro-7-chloro-5H-1,4-benzodiazepin-5-one
  with 6.44 g (0.055 mole) of N,N,-dimethyl-glycinehydrazide [cp. M. Viscontini and J. Meier, Helv. Chim. Acta 33, 1773 (1950)]:- 1-[(dimethylamino)-methyl]-4,5-dihydro-8-chloro-6H-s-triazolo[4,3-a][1,4]benzodiazepin-6-one, and
  with 7.97 g (0.055 mole) of N,N-diethyl-glycinehydrazide (producible analogously to the N,N-dimethyl compound, see above):- 1-[(-diethylamino)-methyl]-4,5-dihydro-8-chloro-6H-s-triazolo[4,3-a][1,4]benzodiazepin-6-one.

b. There are obtained, analogously to Example 1b, by reaction of 1.46 g (0.005 mole) of 1-[(dimethylamino)-methyl]-4,5-dihydro-8-chloro-6H-s-triazolo[4,3-a][1,4] benzodiazepin-6-one in 80 ml of benzene
  with the solution of 1.82 g (0.005 mole) of phenylmagnesium bromide in 4 ml of ether: 1-[(dimethylamino)-methyl]-6-phenyl-8-chloro-4H-s-triazolo[4,3-a][1,4]benzodiazepine, M.P. 165–⅓° (from ethyl acetate/petroleum ether);
  with the solution of 2.0 g (0.005 mole) of (o-fluorophenyl)-magnesium bromide in 10 ml of ether, which is gradually distilled off:- 1-[(dimethylamino)-methyl]-6-(o-fluorophenyl)-8-chloro-4H-s-trizaolo[4,3-a][1,4]benzodiazepine, M.P. 143–144.5° (from ethyl acetate/petroleum ether); and with the solution of 2.16 g (0.005 mole) of (o-chlorophenyl)-magnesium bromide in 10 ml of ether, which is slowly distilled off:- 1-[(dimethylamino)-methyl]-6-(o-chlorophenyl)-8-chloro-4H-s-triazolo[4,3-a][1,4]benzodiazepine, M.P. 198–200° (from ethyl acetate/petroleum ether).

There is obtained, likewise analogously to Example 1b, by reaction of 1.60 g (0.005 mole) of 1-[(diethylamino)-methyl]-4,5-dihydro-8-chloro-6H-s-triazolo[4,3-a][1,4]benzodiazepin-6-one
  with the solution of 1.82 g (0.005 mole) of phenylmagnesium bromide in 4 ml of ether: 1-[(diethylamino)-methyl]-6-phenyl-8-chloro-4H-s-triazolo[4,3-a][1,4]benzodiazepine, M.P. 126–128° (from ethyl acetate/petroleum ether).

EXAMPLE 5 a. There is obtained, analogously to Example 1a, by reaction of 10.5 g (0.05 mole) of 2-amino-3,4-dihydro-7-chloro-5H-1,4-benzodiazepin-5-one with 8.91 g (0.055 mole) of diethoxyacetic acid hydrazide (B.P. 120–150°/0.005 Torr, M.P. 30–40°, producible by reaction of 81.0 g of diethoxyacetic acid methyl ester with 50.0 g of hydrazine hydrate in 800 ml of abs, ethanol, for 20 hours at 25°): 1-(diethoxymethyl)-4,5-dihydro-8-chloro-6H-s-triazolo [4,3-a][1,4] benzodiazepin-6-one.

There is obtained, likewise analogously to Example 1a, by reaction of 10.5 g (0.05 mole) of 2-amino-3,4-dihydro-7-chloro-5H-1,4-benzodiazepin-5-one with 7.32 g (0.055 mole) of dimethoxyacetic acid hydrazide (cp. E.J. Browne and J.B. Polya, J. Chem. Soc. 1962, 5149–5152): 1-(dimethoxymethyl)-4,5-dihydro-8-chloro-6H-s-triazolo[4,3-a][1,4]benzodiazepin-6-one.

b. There are obtained, analogously to Example 1b, by reaction of 1.68 g (0.005 mole) of 1-(diethoxymethyl)-4,5-dihydro-8-chloro-6H-s-triazolo[4,3-a][1,4]benzodiazepin-6-one in 80 ml of benzene
  with the solution of 1.82 g (0.005 mole) of phenylmagnesium bromide in 4 ml of ether: 6-phenyl-8-chloro-4H-s-triazolo[4,3-a][1,4]benzodiazepine-1-carboxaldehyde-diethylacetal, M.P. 133–135° (from ethyl acetate/ether/petroleum ether);
  with the solution of 2.0 g (0.005 mole) of (o-fluorophenyl)-magnesium bromide in 10 ml of ether, which is slowly distilled off: 6-(o-fluorophenyl)-8-chloro-4H-s-triazolo[4,3-a][1,4]benzodiazepine- 1-carboxaldehydediethylacetal, M.P 120–121° (from ethyl acetate/petroleum ether); and with the solution of 2.16 g (0.005 mole) of (o-chlorophenyl)-magnesium bromide in 10 ml of ether, which is slowly distilled off: 6-(o-chlorophenyl)-8-chloro-4H-s-triazolo[4,3-a][1,4]benzodiazepine-1-carboxaldehydediethylacetal, M.P. 120–121.5° (from ethyl acetate/petroleum ether).

There is obtained, likewise analogously to Example 1b, by reaction of 1.54 g (0.005 mole) of 1-(dimethoxymethyl)-4,5-dihydro-8-chloro-6H-s-triazolo[4,3-a][1,4]benzodiazepin-6-one with the solution of 1.82 g (0.005 mole) of phenylmagnesium bromide in 4 ml of ether: 6-phenyl-8-chloro-4H-s-triazolo[4,3-a][1,4]benzodiazepine-1-carboxaldehyde-dimethylacetal, M.P. 166–172° (from ethyl acetate/petroleum ether).

EXAMPLE 6

25 g of 1-(benzyloxymethyl)-6-phenyl-8-chloro-4H-s-triazolo[4,3-a][1,4]benzodiazepine is dissolved in 200 ml of glacial acetic acid; there is then added to the solution 170 ml of 48% aqueous hydrobromic acid. The mixture is heated for 90 minutes at 80° and afterwards cooled to 5°; while stirring is maintained, the pH-value of the mixture is adjusted to 6 with concentrated sodium hydroxide solution, and water as well as methylene chloride subsequently added. The organic phase is separated, washed with saturated aqueous sodium chloride solution, dried over sodium sulphate and concentrated by evaporation. The residue is dissolved in ethyl acetate/methanol(9:1), the solution filtered through a column of 150 g of silica gel (Merck, particle size 0.05 – 0.2 mm), and the column eluted with ethyl acetate/methanol (9:1) to (7:3). The eluate is concentrated by evaporation and the residue crystallised from ethyl acetate/ether. The obtained product is 6-phenyl-8-chloro-4H-s-triazolo[4,3-a][1,4] benzodiazepine-1-methanol, M.P. 210–211°.

There is obtained in an analogous manner, starting with 5 g of 1-(benzyloxymethyl)-6-phenyl-4H-s-triazolo-[4,3-a][1,4]benzodiazepine in 40 ml of glacial acetic acid and 35 ml of 48% aqueous hydrobromic acid with a reaction of 105 minutes: 6-phenyl-4H-s-triazolo-[4,3-a][1,4]benzodiazepine-1-methanol, M.P. 205–206° (from ethyl acetate/petroleum ether).

EXAMPLE 7

An amount of 24 ml of 48% aqueous hydrobromic acid is added at 25° to a solution of 3.0 g of 1-[(p-methoxybenzyloxy)-methyl]-6-phenyl-8-chloro-4H-s-triazolo[4,3-a][1,4]benzodiazepine in 30 ml of glacial acetic acid. The reaction mixture is stirred for 20 minutes, then neutralised with 30% sodium hydroxide solution, and extracted with methylene chloride. The organic phase is separated, washed with water, dried over sodium sulphate and concentrated by evaporation. Crystallisation of the residue from ethyl acetate/ether/petroleum ether yields 6-phenyl-8-chloro-4H-s-triazolo[4,3-a][1,4]benzodiazepine-1-methanol, M.P. 209–211°.

The following are obtained in an analogous manner:
starting with 3.23 g of 1-[(p-methoxybenzyloxy)-methyl]-6-(o-chlorophenyl)-8-chloro-4H-s-triazolo[4,3-a][1,4]benzodiazepine with a reaction temperature of 20° and a reaction time of 55 minutes: 6-(o-chlorophenyl)-8-chloro-4H-s-triazolo[4,3-a][1,4]benzodiazepine-1-methanol, M.P. 235–237° (from ethyl acetate/petroleum ether); and starting with 3.12 g of 1-[(p-methoxybenzyloxy)-methyl]-6-(o-fluorophenyl)-8-chloro-4H-s-triazolo[4,3-a][1,4] benzodiazepine, with a reaction temperature of 20° and a reaction time of 15 minutes: 6-(o-fluorophenyl)-8-chloro-4H-s-triazolo[4,3-a][1,4]benzodiazepine-1-methanol, M.P. 195–197° (from ethyl acetate/petroleum ether).

EXAMPLE 8

An amount of 0.13 ml of 70% perchloric acid is added at 25° to a solution of 0.5 g of 6-phenyl-8-chloro-4H-s-triazolo[4,3-a][1,4]benzodiazepine-1-methanol in 1 ml of methanol and 1 ml of acetone. The mixture is allowed to stand for 16 hours at 0°; the precipitated crystals are then filtered under suction and recrystallised from methanol/acetone. The obtained 6-phenyl-8-chloro-4H-s-triazolo[4,3-a][1,4]benzodiazepine-1-methanol-perchlorate melts at 247–250°. The crystals contain an equimolar amount of acetone.

What we claim is:

1. A compound of the general formula II

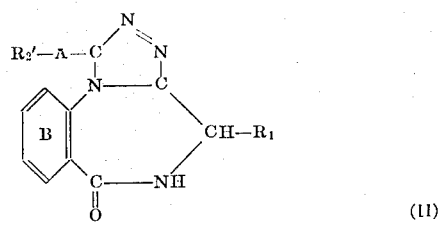

(II)

wherein
$R_1$ represents hydrogen, or an alkyl group having 1 to 3 carbon atoms, A represents an alkylene group having 1 to 3 carbon atoms, $R_2'$ represents alkoxy having 1 to 6 carbon atoms, benzyloxy, chlorobenzyloxy, methyl-benzyloxy, methoxybenzyloxy, trimethoxy-benzyloxy, diphenylmethoxy, dialkylamino, wherein the alkyl groups contain 1 to 6 carbon atoms, N-alkylaralkylamino, wherein the alkyl group contains 1 to 6 carbon atoms and the aralkyl group is a phenyl-substituted alkyl group wherein the alkyl group has 1 to 3 carbon atoms, diaralkylamino wherein the aralkyl groups are phenyl-substituted alkyl groups wherein the alkyl group has 1 to 3 carbon atoms, polymethyleneimino having 5 to 7 ring members or morpholino, and said polymethyleneimino and morpholino members substituted by lower alkyl and which contain including these at most 10 carbon atoms, or $R_2'$-A together represent dialkoxymethyl of which the alkoxy radicals have 1 to 4 carbon atoms, or alkylenedioxymethyl having in all 3 to 6 carbon atoms, and the ring B is unsubstituted or substituted by halogen up to atomic number 35, alkyl or alkoxy each having 1 to 6 carbon atoms, or a trifluoromethyl group.

2. A compound according to claim 1, which is 1-(benzyloxymethyl)-4,5-dihydro-8-chloro-6H-s-triazolo[4,3-a][1,4]benzodiazepin-6-one.

3. A compound according to claim 1, which is 1-[(p-methoxybenzyloxy)-methyl]-4,5-dihydro-8-chloro-6H-s-triazolo[4,3-a][1,4]benzodiazepin-6-one.

4. A compound according to claim 1, which is 1-(2-benzyloxyethyl)-4,5-dihydro-8-chloro-6H-s-triazolo[4,3-a][1,4]benzodiazepin-6-one.

5. A compound according to claim 1, which is 1-[(dimethylamino)-methyl]-4,5-dihydro-8-chloro-6H-s-triazolo[4,3-a][1,4]benzodiazepin-6-one.

6. A compound according to claim 1, which is 1-[(diethylamino)-methyl]-4,5-dihydro-8-chloro-6H-s-triazolo[4,3-a][1,4]benzodiazepin-6-one.

7. A compound according to claim 1, which is 1-(dimethoxymethyl)-4,5-dihydro-8-chloro-6H-s-triazolo[4,3-a][1,4]benzodiazepin-6-one.

8. A compound according to claim 1, which is 1-(diethoxymethyl)-4,5-dihydro-8-chloro-6H-s-triazolo[4,3-a][1,4]benzodiazepin-6-one.

* * * * *